United States Patent [19]

Juday

[11] Patent Number: 5,518,632

[45] Date of Patent: May 21, 1996

[54] METHOD OF RECOVERING POLYMERIZABLE LIQUID RESINS FROM RINSE WATER

[76] Inventor: Thomas W. Juday, 1060 Lower Ridgeway, Elm Grove, Wis. 53122

[21] Appl. No.: 218,006

[22] Filed: Mar. 25, 1994

[51] Int. Cl.⁶ ............................... B01D 17/00; C02F 1/52
[52] U.S. Cl. .......................... 210/705; 210/712; 210/767; 210/908; 210/703
[58] Field of Search ..................................... 210/703, 704, 210/705, 712, 767, 908

[56] References Cited

U.S. PATENT DOCUMENTS 5,149,441   9/1992   Welch, II et al. ...................... 210/719
5,273,662   12/1993   Muisener et al. ...................... 210/737

*Primary Examiner*—Neil McCarthy
*Attorney, Agent, or Firm*—Quarles & Brady

[57] ABSTRACT

A method for separating water soluble, polymerizable resin from rinse water containing such resin which comprises adjusting the specific gravity of the rinse water so that the resin floats on the surface of the rinse water. The resin is then removed and purified for reuse.

9 Claims, 2 Drawing Sheets

METHOD OF RECOVERING POLYMERIZABLE LIQUID RESINS FROM RINSE WATER

FIELD OF THE INVENTION

This invention relates to a novel method of recovering from rinse water the water soluble polymerizable resins which were used in sealants to impregnate and seal the pores in cast metal and powdered metal articles.

BACKGROUND ART

Many types of metal articles or components, such as engine blocks, heads, oil and water pumps, brake cylinders, carburetors, transmission cases, etc., are manufactured by casting various metals or alloys, e.g. cast iron, aluminum, brass, magnesium, bronze, etc. Metal articles also are made by powdered metal techniques, in which metal powder is pressed in suitably shaped molds and then sintered at an elevated temperature to consolidate the structure, reduce porosity and impart useful strength; since this is essentially a solid diffusion process, a very high degree of dimensional accuracy is possible and large numbers of parts can be economically produced. A few examples of powdered metal articles are hydraulic pump components, gears, cams, bearings, injector bodies, levers and automotive trim.

With any of the metal casting and powdered metal processes in general use, it is typical for a varying proportion of cast articles and all powdered metal articles to have pores that extend through or partially through a wall of the articles. Because these pores can impair the usefulness of the article, such as by resulting in gaseous or fluid leakage, or preventing normal plating operations, the art of impregnating metal articles to fill the pores has developed in order that the articles can be made useful for their intended purpose.

The most effective technology for impregnation of metal articles is the "dry vacuum-pressure" method in which metal articles are placed in a closed vessel and the vessel is subjected to a vacuum (such as 2 to 10 Torr for 10 to 15 minutes) to cause air entrapped in any pores in the dry articles to escape. Liquid sealant is drawn from a reservoir into the vessel so as to cover and fill the pores of the article. The vacuum is then released and pressure is applied to the liquid sealant level (such as air at 100 psi for 10 to 15 minutes) to drive the sealant further into the pores. Following this, the excess sealant is drained, the parts rinsed with water to remove any remaining sealant, and the sealant in the pores is polymerized, i.e. cured, to fill the pores with solid material.

Another impregnation method is a "dry vacuum" process in which metal articles are placed in a closed vessel and the vessel is subjected to a vacuum (e.g. 2 to 10 Torr for 10 to 15 minutes) to cause air entrapped in any pores in the articles to escape. The articles are then submerged in or flooded by liquid sealant, so as to cover the articles and fill the pores and allowed to "soak" for 10 to 15 minutes at atmospheric pressure, following which excess sealant is drained, the articles are rinsed with water to remove any remaining sealant, and the sealant in the pores is polymerized to fill the pores with solid material.

Another commonly practiced technology for impregnation of metal articles is the so-called "wet vacuum" process that includes the steps of submerging the articles in a bath of liquid sealant in an enclosed impregnation tank, and then evacuating the tank to a sufficiently low vacuum (e.g. 2 to 10 Torr for 10 to 15 minutes) to enable most of the air entrapped in pores in the articles to escape so that the pores can be filled with liquid sealant. The vacuum in the impregnating tank is then released and the articles are transferred to a tank in which the excess sealant is allowed to drain off. The articles are transferred to another tank in which they are rinsed with water in order to wash off excess sealant. Next, the articles are transferred to a curing tank to allow the sealant to polymerize or cure to a solid material to fill the pores.

The sealants of choice for almost all cast metal articles and many powdered metal articles are liquid, water-soluble, heat curable sealants containing methacrylate or methacrylate/polyester resins that polymerize in the presence of air or oxygen.

These sealants are of interest to end users since they can be cured at relatively low temperatures in relatively short time periods, such as by curing with hot water in a temperature range of about 85° C. to 90° C. for a period of about 4 minutes to 15 minutes. Rapid curing at moderate temperatures facilitates impregnation of metal articles and reduces the time required for processing the articles.

Since the first acceptance in industry some 40 years ago of water soluble sealants, the post impregnation rinse waters, which are generated in the practice of all of the above-described methods and which are usually contaminated with methacrylates, polyesters, dyes, catalysts and surfactants to a greater or lesser degree, have been routinely flushed into metropolitan sewage systems. However, today although the methacrylate and polyester resins are not hazardous they cannot be disposed of in most metropolitan sewage systems because they test out as "grease" and "oil" when tested in accordance with EPA standards. Therefore, their presence is being monitored and any violations of the EPA standards are being enforced with ever-increasing stringency.

Various methods of removing the resins from the rinse water have been attempted. In one method, the rinse water is simply boiled, to polymerize the resin present (thus changing the resin state from liquid to solid and rendering it useless) and then filtering out the resulting solid. This method is expensive and requires disposal of the collected solids which might be considered in some situations to be "hazardous substances".

Another method employs the addition of high molecular, non-ionic surfactants which have hydrocarbon mitigating properties. This method also is very expensive and once the surfactant/resin emulsion is removed from the water, it is almost impossible to separate the surfactant from the resin. The result is that neither can be reused.

It would be advantageous to have a simple, inexpensive method of removing resin from the rinse water which permits the resin to be recovered and reused.

SUMMARY OF THE INVENTION

A principal object of this invention is to disclose an inexpensive, simple method of separating and recovering a water soluble, heat curable liquid resin from post impregnation rinse water.

Another object is to disclose a method of recovering the resin from the rinse water in a condition in which it can be reused in a sealant.

Another object is to provide a method by which water soluble, liquid resin can be removed from rinse water so that the rinse water can be reused or safely discarded.

These and other objects will become apparent from the description that follows.

The present invention relates to a novel method for separating water soluble, heat curable liquid resin contained in sealants for porous cast metal and powdered metal articles from rinse water. The method comprises adding to the rinse water a substance which increases the specific gravity of the rinse water so that resin present in the rinse water separates and floats upon the water, thus separating the resin from the water.

In a preferred embodiment, the method comprises changing the specific gravity of the rinse water from about 1.00 up to about 1.10 by the addition of a water soluble salt to the rinse water. As the specific gravity of the resins in most impregnation sealants ranges from about 1.02 to about 1.08, changing the specific gravity of the rinse water to about 1.10 or more actually forces the now lighter resins out of the water and causes them to float on the rinse water surface, much like an oil slick on the ocean. The resins are then collected from off the surface of the water.

Almost any salt or compound which will change the specific gravity of water can be used as long as it is not corrosive to the apparatus with which it is used. However, chloride salts, such as calcium, sodium or potassium chlorides are preferred, especially in the form of granules of table salt size for ease of dissolution. A preferred product is Morton Salt's Sodium Chloride Purex product.

The method of the present invention makes it possible to drastically reduce (up to 99.5+%) the amount of contaminants present in rinse waters so that the resulting rinse water can be put into metropolitan sewage systems. In addition, where in-house water treatment plants are used, the method of the invention makes it possible to reduce the contamination levels of the rinse water prior to in-house treatment.

Another major advantage of the present invention is that it makes it possible to remove the resins from the rinse waters in a condition in which they can be reconstituted and reused at a cost considerably below that of virgin resins.

Finally, the method of the invention drastically reduces the amount of water, power and corrosion inhibitor which are used in the impregnation process because the continued overflowing of the rinse tanks with fresh water is no longer necessary.

BRIEF DESCRIPTION OF THE PREFERRED EMBODIMENTS

In the preferred practice of the method of the present invention a water soluble salt, such as sodium chloride, is added to the rinse water containing resin in an amount which is effective to adjust the specific gravity to about 1.10 so that the resin floats on the water. The resin is then collected from the surface of the water, vacuum desiccated and reformulated to provide an acceptable sealant for use in impregnation.

Figure 1:
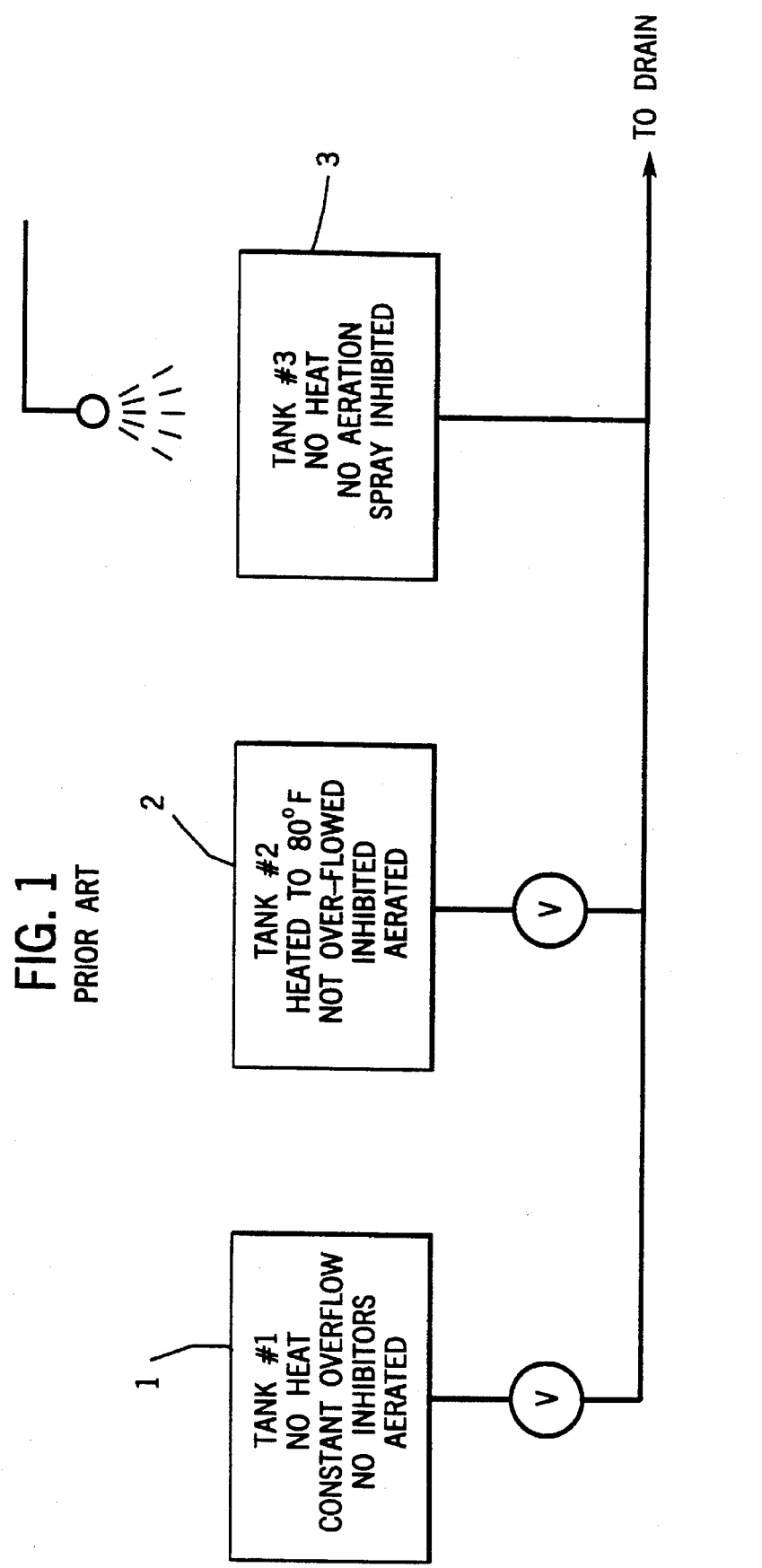
FIG. 1 is a schematic view of a prior art rinse water treatment tank system; and, FIG. 2 is a schematic view of a preferred rinse water treatment tank system for use in the method of the present invention.

In the prior art system illustrated in FIG. 1, the impregnated parts in a basket (not shown) are placed in and rinsed with water in tank 1. To assist the water in removing sealant, the tank is usually aerated with compressed air and constantly overflowed. Tank 1 is not heated and its purpose is to remove by far the majority of excess sealant from the parts and basket. The parts and the basket are then moved to tank 2, rinsed with water containing a corrosion inhibiter and aerated with compressed air. The purpose of tank 2 is to remove any sealant from the parts and basket not removed in rinse tank 1. Tank 2 is not over-flowed, but it is heated to and maintained at about 80° F. The parts and basket are then moved to tank 3 which is not aerated nor heated. Tank 3 is a hose-down station where corrosion inhibited water which is sprayed onto the parts and the basket removes any vestiges of the sealant or rinse water from tank 2 from the parts and basket before they enter a cure tank.

Figure 2:
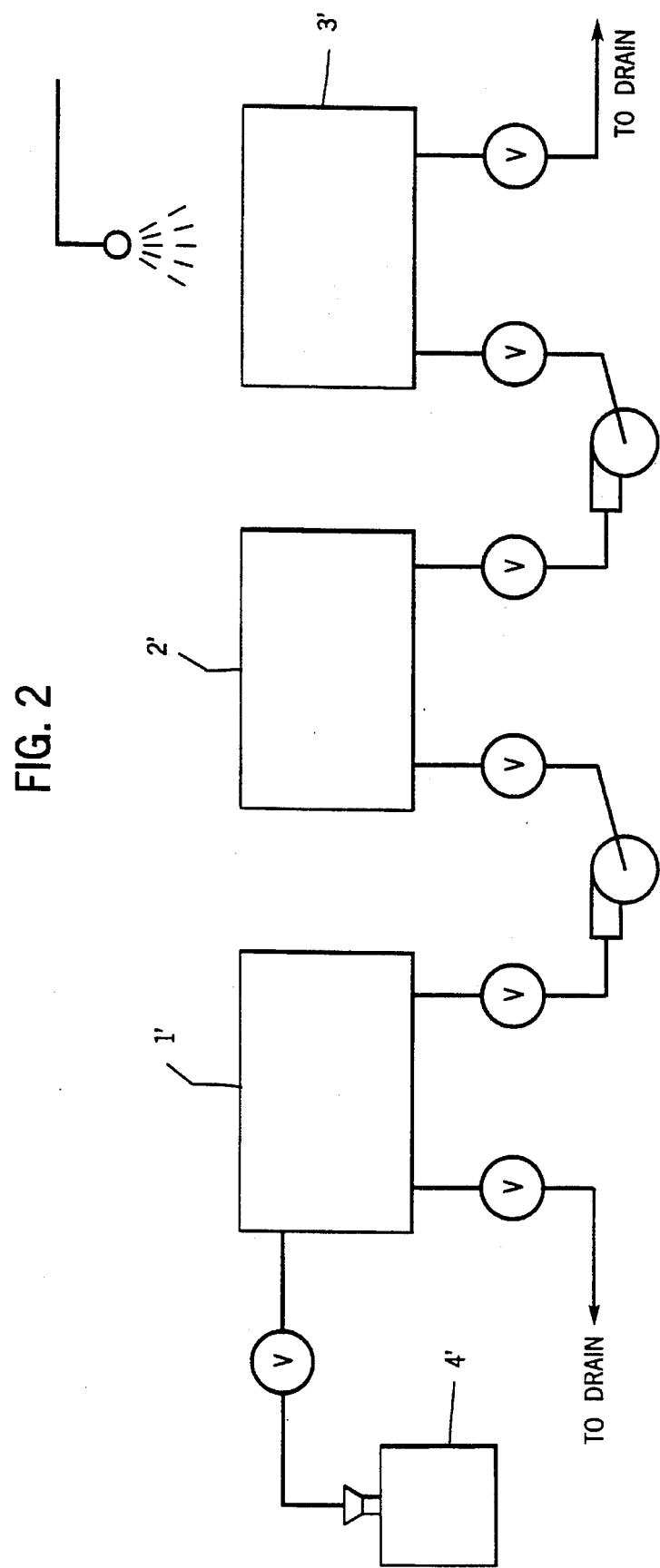

In the preferred tank system of the present invention seen in FIG. 2, the parts and the basket (not shown) are first placed in tank 1'. It is then aerated with compressed air and/or surged for 2 minutes, but it is not over-flowed. The water in tank 1' is heated to 80° F. Tank 1' removes by far the majority of excess sealant from the parts and basket and retains the rinse water containing the sealant for subsequent removal of the resin and further processing. Tank 2' and tank 3' of the system of FIG. 2. perform the same roles as tanks 2 and 3, respectively of the prior art system of FIG. 1.

When the resin concentration in the rinse water in tank 1' of the preferred system of FIG. 2 reaches a minimum of about 3% (easily monitored by a simple hydrometer test) and a maximum of about 8%, the residual resin is ready for removal. An effective amount of a specific gravity increasing agent (preferably about 15% to about 20% by weight of sodium chloride) is slowly added to the rinse water, while continuing the aeration. Once the proper amount of agent has been added to adjust the specific gravity of the rinse water to the desired specific gravity (e.g. about 1.10), the aeration is continued for another 10 minutes and then stopped. Within 15 minutes after the aeration is stopped, the separation of the resin from the rinse water commences. After about four hours and for up to several days later, the resin which is floating on the surface of the water can either be wet vacuumed off, or drained off through an optional over-flow system into tank 4'. The recovered resin can then be sent back to the manufacturer for drying (e.g. vacuum desiccation), filtration, testing, reformulation into reusable sealant and, if desired, returned to the same customer.

After the resin has been removed, the remaining rinse water may or may not be further filtered and treated to remove solids and other undesired materials and then disposed of in a metropolitan sewage system or diverted to an in-house water treatment system.

To conserve water, the water contents of tank 2' can be reused as the rinse water in tank 1' and the water contents of tank 3' can be reused as the rinse water in tank 2'. The frequency of changing or dumping the water from the system will vary greatly with the make-up of the loads being processed (relatively few, large castings or many small components such as powdered metal parts) but usually from 60 to 240 loads can be processed before changing the water. As the total processing time for a load is approximately 45 minutes, the water in the system normally would not have to be changed for a minimum of 5 to a maximum of 20 eight hour work days.

The following Examples illustrate the method of the present invention.

EXAMPLE 1

The test specimens were impregnated with a liquid, water soluble, heat curable sealant containing methacrylate and polyester resins by the dry vacuum-pressure method.

The specimens were first subjected to a dry vacuum cycle for 20 minutes at 1.5 to 2 Torr vacuum to allow the escape of air entrapped in the pores or voids of the specimens. The test specimens were then submerged in the sealant for 20 minutes at 1.5 to 2 Torr vacuum. While still submersed in the sealant, the specimen was subjected to a pressure cycle for 20 minutes at 100 psi (6.8 atmospheres). Next, the impregnated specimens were drained for 15 minutes to allow excess sealant to drain from the surface of the specimens. The specimens were moved to a first tank (1') where they were subjected to a light rinse cycle during which they were washed with tap water at room temperature for 1 minute. The water in the tank was aerated with compressed air and heated to about 80° F. The specimens were then moved to a second tank (2') rinsed with water containing a corrosion inhibitor, aerated and maintained at a temperature of 80° F. for 10 minutes. Next, the parts are moved to a third tank (3') and hosed down with water containing corrosion inhibitor. Finally, the impregnated specimens were subjected to a water cure cycle in a cure tank (not shown) in which the specimens were submersed in water heated to 195° F. for a period of 10 minutes to polymerize the resins. The method was repeated with additional specimens until the resin concentration had reached about 3% by weight.

To recover the sealant from the rinse water after the concentration of the resin in the water of tank 1' had reached about 3%, the specific gravity of the water in tank 1' was raised to about 1.10 by the addition of 470 lbs (16%) of sodium chloride while maintaining the water temperature at about 80° F. with aeration. The aeration was then stopped. Within 15 minutes the resin started to separate from the water and to rise to the surface. After about 4 hours a layer of resin was floating upon the surface of the water in tank 1'. The resin was drained off into an overflow tank (4), vacuum desiccated and reformulated for use.

The foregoing description of the present invention is made in such full and complete detail as to enable those of ordinary skill in the art to understand and practice the invention, but it is anticipated that those skilled in the art will be able to devise changes to the described embodiments that will remain within the true spirit and scope of this invention.

I claim:

1. A method for removing water soluble, polymerizable resin used for impregnating and sealing pores of cast metal articles and powdered metal articles from rinse water containing such resin, said method comprising adding an effective amount of a specific gravity increasing agent to the rinse water to adjust the specific gravity of the rinse water to a specific gravity at which the resin rises to the top of the rinse water and then removing the resin therefrom.

2. A method of claim 1 in which the specific gravity of the rinse water is adjusted to about 1.10.

3. A method of claim 1 in which the agent being added is a soluble salt.

4. A method of claim 1 in which the agent is sodium chloride.

5. A method of claim 1 in which the rinse water is heated to a temperature below the curing temperature of the resin before adding the agent.

6. A method of claim 1 in which the resin is dewatered by vacuum.

7. A method of claim 1 in which the removed resin is reformulated for reuse.

8. A method of claim 1 in which the resin is a methacrylate resin.

9. A method of claim 1 in which the resin is a methacrylate/polyester resin.

* * * * *